US010339246B2

(12) United States Patent
Ganzhorn (10) Patent No.: US 10,339,246 B2
(45) Date of Patent: Jul. 2, 2019

(54) SCHEMATIC OVERLAY FOR DESIGN AND VERIFICATION (71) Applicant: Synopsys, Inc., Mountain View, CA (US)

(72) Inventor: Salem Lee Ganzhorn, Apex, NC (US)

(73) Assignee: Synopsys, Inc., Mountain View, CA (US)

( * ) Notice: Subject to any disclaimer, the term of this patent is extended or adjusted under 35 U.S.C. 154(b) by 107 days.

(21) Appl. No.: 15/594,142

(22) Filed: May 12, 2017

(65) Prior Publication Data

US 2017/0344685 A1 Nov. 30, 2017

Related U.S. Application Data (60) Provisional application No. 62/342,110, filed on May 26, 2016.

(51) Int. Cl.
*G06F 17/50* (2006.01)

(52) U.S. Cl.
CPC ........ *G06F 17/5054* (2013.01); *G06F 17/504* (2013.01); *G06F 17/5077* (2013.01); *G06F 17/5045* (2013.01); *G06F 17/5081* (2013.01); *G06F 2217/74* (2013.01)

(58) Field of Classification Search
CPC ............... G06F 17/504; G06F 17/5054; G06F 17/5077; G06F 2217/74; G06F 17/5045; G06F 17/5081
See application file for complete search history.

(56) References Cited

U.S. PATENT DOCUMENTS

| 5,901,064 | A * | 5/1999 | Weber ................. | G06F 17/5022 716/103 |
| 6,230,305 | B1 * | 5/2001 | Meares ................. | G06F 17/50 716/102 |
| 6,675,366 | B1 * | 1/2004 | Nolan ................. | G06F 17/5022 716/102 |
| 7,263,674 | B2 * | 8/2007 | Lorenz ................ | G06F 17/5009 703/2 |
| 7,990,375 | B2 * | 8/2011 | Kohli ................. | G06F 17/5045 345/418 |
| 8,095,898 | B1 * | 1/2012 | Wu ........................ | G06F 17/50 716/102 |
| 8,205,183 | B1 * | 6/2012 | Goh ..................... | G06F 17/5045 716/126 |
| 8,281,272 | B1 * | 10/2012 | Ginetti ................ | G06F 17/5068 716/119 |
| 8,397,194 | B2 * | 3/2013 | Uppaluri ............. | G06F 17/5022 716/107 |
| 8,407,635 | B2 * | 3/2013 | Chopra ................ | G06F 17/504 703/16 |

(Continued)

*Primary Examiner* — Helen Rossoshek
(74) *Attorney, Agent, or Firm* — Fenwick & West LLP (57) ABSTRACT Embodiments relate to schematic overlays describing modification to a base design for exploring modification or verification of the base design. Test circuitry may be modified or inserted without effecting the change in a base design schematics. The modifications to the base design schematics are also highlighted in views at a level of hierarchy where the modifications were made as well as at a higher levels of circuit abstraction. By using schematic overlays, modification to the base design can be avoided while creating a testbench.

18 Claims, 8 Drawing Sheets (56) References Cited

U.S. PATENT DOCUMENTS

| | | | | |
|---|---|---|---|---|
| 8,719,754 B1* | 5/2014 | Ginetti | ............... | G06F 17/5072 |
| | | | | 716/119 |
| 8,898,618 B2* | 11/2014 | Chin | ................... | G06F 3/0482 |
| | | | | 703/13 |
| 8,924,913 B1* | 12/2014 | Goh | .................. | G06F 17/5045 |
| | | | | 716/102 |
| 9,122,384 B1* | 9/2015 | Kohli | ....................... | G09G 5/02 |
| 9,760,666 B1* | 9/2017 | Gandotra | ............ | G06F 17/5045 |
| 9,779,193 B1* | 10/2017 | Ginetti | ............... | G06F 17/5045 |
| 9,858,374 B1* | 1/2018 | Purchase | ............. | G06F 17/5045 |
| 9,934,354 B1* | 4/2018 | Kukal | ................ | G06F 17/5081 |
| 10,094,875 B1* | 10/2018 | Lin | ................. | G01R 31/31704 |
| 2006/0265664 A1* | 11/2006 | Simons | ................ | A62B 99/00 |
| | | | | 715/772 |
| 2012/0180014 A1* | 7/2012 | Fang | ................. | G06F 17/5081 |
| | | | | 716/112 |
| 2016/0253450 A1* | 9/2016 | Kandel | .................. | H01L 22/30 |
| | | | | 356/401 |
| 2016/0378904 A1* | 12/2016 | Greco | ................ | G06F 17/5081 |
| | | | | 716/51 |
| 2018/0011959 A1* | 1/2018 | Irissou | ............... | G06F 17/5036 |

* cited by examiner

SCHEMATIC OVERLAY FOR DESIGN AND VERIFICATION

CROSS REFERENCE TO RELATED APPLICATION

This application claims priority to U.S. Provisional Application No. 62/342,110, filed on May 26, 2016, which is incorporated by reference herein in its entirety.

BACKGROUND

Field of the Disclosure

The present disclosure generally relates to designing of an integrated circuit (IC), and specifically to using an overlay schematic over a base circuit schematic to generate a modified circuit design.

Description of the Related Arts

The design and verification of electronic circuits in an integrated circuit (IC) involves experimentation and debugging, typically accomplished with a schematic testbench and/or modifying of design schematics. In typical design and verification methodologies, the testbench is created as a new schematic containing an instance of the design under test along with relevant test sources, stimulus and loads. The design under test is typically treated as a black box accessed only through input/output ports while the internal nodes and instances are usually not modified if avoidable.

Modifications within the black box are error prone because it is difficult to differentiate between permanent design modifications and temporary test modifications. An alternative to modifying the design is to copy the schematics to a new library and make temporary changes outside of the base design schematics. Such alternative approach has the benefit of keeping test changes external to the base design data but suffers from synchronization issues. That is, if the base design data changes, the copied data must be updated as well with incremental changes. Further, in the absence of tools to analyze and propagate the incremental changes, the process is manual, tedious and error prone.

The testbench schematic also causes problems for post layout analysis because the testbench is not part of the layout hierarchy. Since the testbench does not have a physical layout representation, analysis tools maintain a correspondence between schematic and layout paths.

SUMMARY

Embodiments relate to modifying a base schematic data of an integrated circuit (IC) design by using an overlay schematic data. At least a part of a base schematic data is displayed. The base schematic data represents a base circuit including base objects and base logical connectivity between the base objects. As modification to the base circuit is detected, schematic overlay data representing the modification to the base circuit is generated instead of modifying the base schematic data. A modified schematic data representing the base schematic data as modified by the schematic overlay data may be displayed. At least one EDA operation is performed on the modified circuit while retaining the base schematic data unchanged.

BRIEF DESCRIPTION OF THE DRAWINGS

The teachings of the embodiments of the present invention can be readily understood by considering the following detailed description in conjunction with the accompanying drawings.

The figures depict various embodiments of the present invention for purposes of illustration only. One skilled in the art will readily recognize from the following discussion that alternative embodiments of the structures and methods illustrated herein may be employed without departing from the principles described herein.

DETAILED DESCRIPTION

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digit of each reference number corresponds to the figure in which the reference number is first used.

Embodiments relate to schematic overlays describing modification to a base schematic data for exploring modification or verification of a circuit design. Test circuitry may be modified or inserted in the form of an overlay schematic data without effecting the change in a base schematic data. The modifications to the base schematic data are also highlighted in views at a level of hierarchy where the modifications are made as well as at higher levels of circuit abstraction.

Schematic data described herein refers to data that can be used for generating a schematic view of circuit objects and their connections.

Overview of EDA Design Flow

Figure 1:
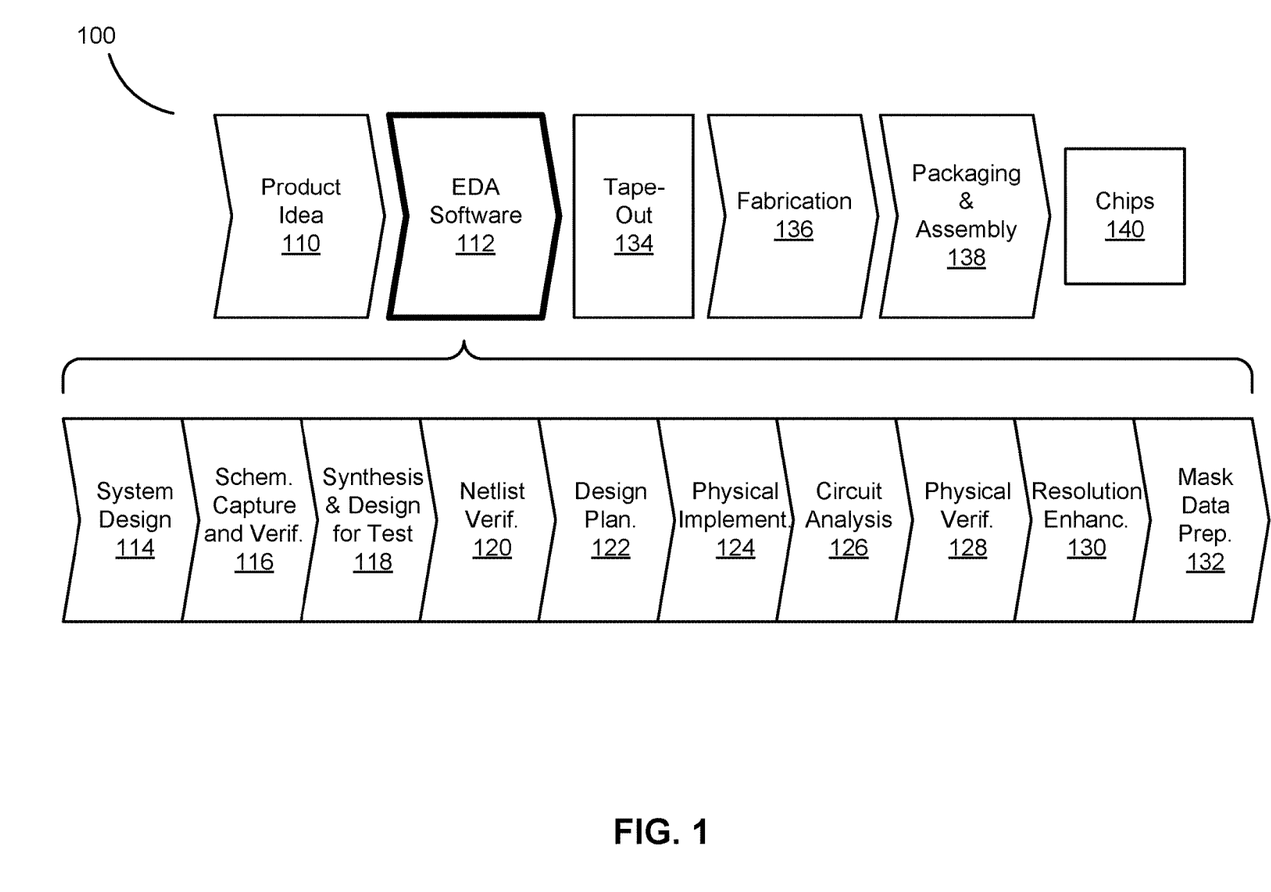
FIG. 1 is an example flow illustrating various operations for designing and fabricating an integrated circuit, according to an embodiment.

FIG. 1 is an example flow 100 illustrating various operations for designing and fabricating an integrated circuit, in accordance with an embodiment. The design process 100 starts with the generation of a product idea 110, which is realized during a design process that uses electronic design automation (EDA) software 112. When the design is finalized, it can be taped-out 134. After tape-out 134, a semiconductor die is fabricated 136 to form the various objects (e.g., gates, metal layers, vias) in the integrated circuit design. Packaging and assembly processes 138 are performed, which result in finished chips 140.

The EDA software 112 may be implemented in one or more computing devices such as the computing device 200, illustrated and described below with reference to FIG. 2. For example, the EDA software 112 is stored as instructions in a computer-readable medium which are executed by a processor for performing operations 114-132 of the design flow, which are described below. This design flow description is for illustration purposes. In particular, this description is not meant to limit the present disclosure. For example, an actual integrated circuit design may require a designer to perform the design operations in a different sequence than the sequence described herein.

During system design 114, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During schematic capture and verification 116, VHDL or Verilog code for modules in the circuit are generated to represent the design or a portion of the design and is checked for functional accuracy. More specifically, the design is checked to ensure that it produces the correct outputs. Example EDA software products from Synopsys, Inc. of Mountain View, Calif. that can be used at this stage include: Custom Compiler®, VCS®, Vera®, 10 Designware®, Magellan®, Formality®, ESP® and Leda® products. Embodiments described herein relate primarily to the schematic capture and verification 116.

During synthesis and design for test 118, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Custom Compiler®, Design Compiler®, Physical Compiler®, Test Compiler®, Power Compiler®, FPGA Compiler®, Tetramax®, and Designware® products.

During netlist verification 120, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 122, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 124, the placement (positioning of circuit elements) and routing (connection of the same) occurs. Example EDA software products from Synopsys, Inc. of Mountain View, Calif. that can be used at this stage include: Custom Compiler, the Astro® and IC Compiler® products.

During circuit analysis 126, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products. During physical verification 128, the design is checked to ensure correctness for: manufacturing, electrical issues, lithographic issues, and circuitry. Embodiments described herein also relate to the circuit analysis 126.

During resolution enhancement 130, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 132, the 'tape-out' data for production of masks to produce finished chips is provided. Example EDA software products from Synopsys, Inc. of Mountain View, Calif. that can be used at this stage include the CATS® family of products.

Formal verification may be performed at the stage of logic design and functional verification 116. Low power design specification is typically processed during stages synthesis and design for test 118 or netlist verification 120.

Example Computing Device

Figure 2:
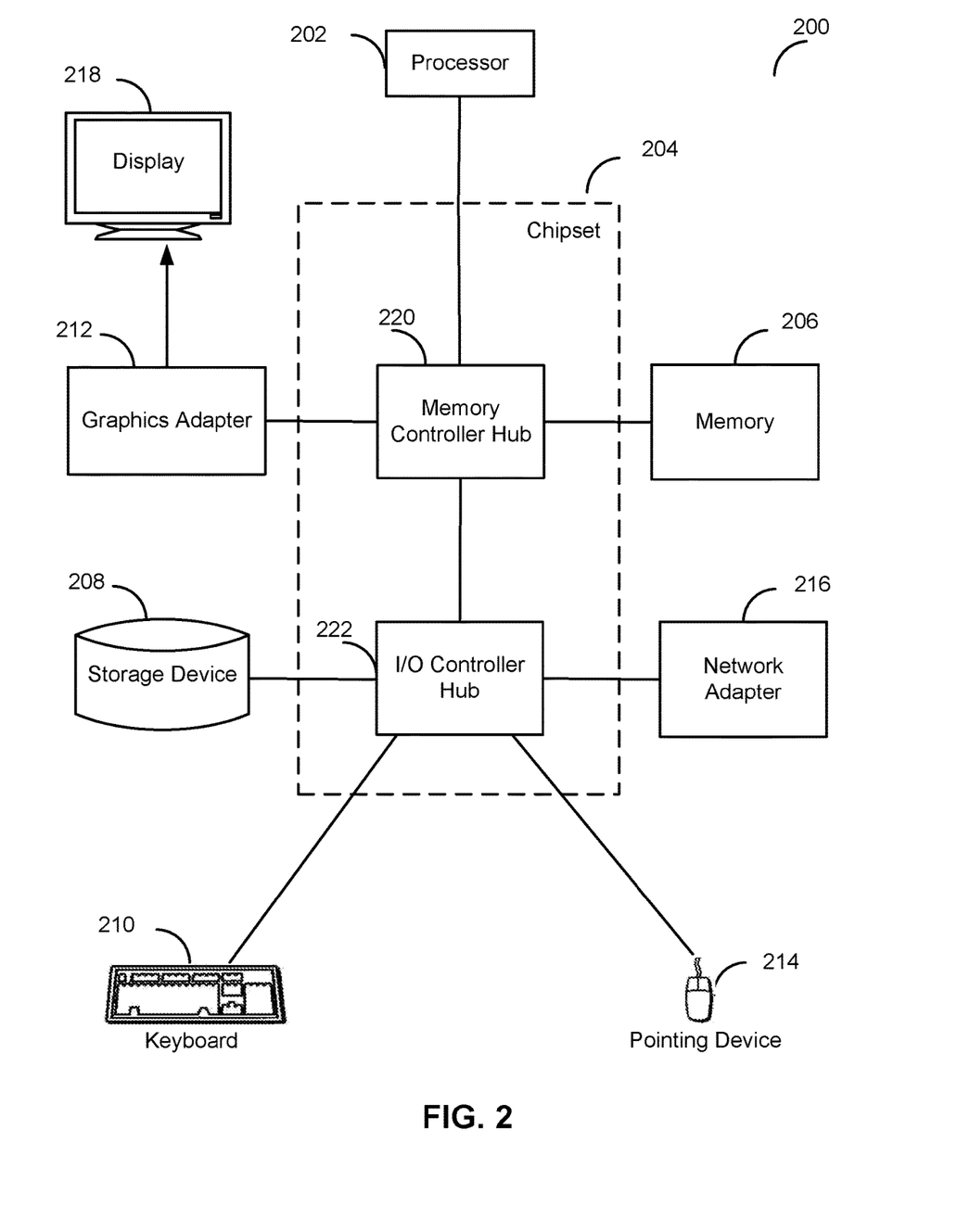
FIG. 2 is a high-level block diagram illustrating an example computing device for performing custom designing of a circuit, according to an embodiment.

FIG. 2 is a high-level block diagram illustrating an example computing device 200 for designing an integrated circuit, in accordance with an embodiment. The computing device 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computing device 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computing device 200. The graphics adapter 212 displays images and other information on the display 218. The network adapter 216 couples the computing device 200 to one or more computer networks.

The computing device 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202. The types of computing devices 200 used can vary depending upon the embodiment and requirements. For example, a computing device may lack displays, keyboards, and/or other devices shown in FIG. 10.

A circuit design system 300 described below in detail with reference to FIG. 3 below may be embodied by the computing device 200.

Example System for Reuse of Layout-Dependent Effects

Figure 3:
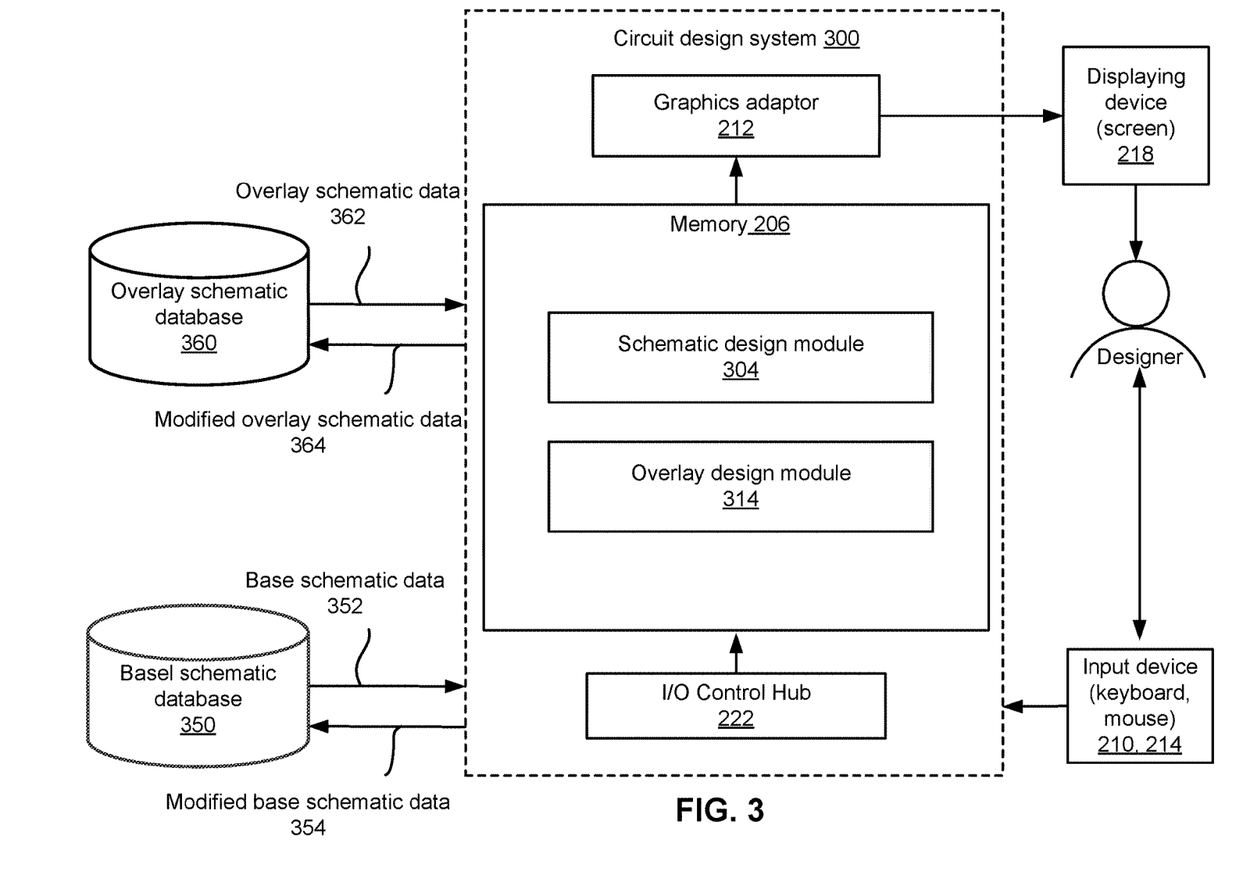
FIG. 3 is a block diagram illustrating an example circuit design system for placing circuit elements using customized track patterns, according to an embodiment.

FIG. 3 is a block diagram illustrating the circuit design system 300, according to one embodiment. The circuit design system 300 performs, among others, the operations of overlaying schematic data on a base schematic data for performing electronic design automation (EDA) operations based on schematics such as simulation, Layout Versus Schematic (LVS), schematic driven layout and schematic verification.

For this purpose, the circuit design system 300 communicates with a circuit design database 350 and an overlay schematic database 360, and interacts with a user via input devices (e.g., keyboard 210, mouse 214) and output devices (e.g., displaying device 218). The user inputs provided by the user via the input devices 210, 214 may instruct the circuit design system 300 to generate or modify overlay schematic data, and perform EDA operations on schematic data which is a base schematic data modified by the overlay schematic data.

The circuit design database 350 is a database that interacts with the circuit design system 300 to provide base schematic data 352 and stores modified schematic data 354. The base schematic data 352 and modified schematic data 354 may include, among other information, information of circuit objects (e.g., devices and cells), information on connectivity of these circuit objects, version information, and time stamp indicating when the last changes were made to the modified schematic data. After the base schematic data is modified and stored as modified schematic data 354 in the base schematic database 350, the modified schematic data 354 becomes the base schematic data 352 for the purposed of embodiments described herein. One of the purposes of embodiments described herein is to provide a scheme to create variants to the base schematic data 352 without modifying the base schematic data 352.

The circuit design database 350 may be embodied, for example, as OpenAccess database. Although the circuit design database 350 is described as being a component separate from the circuit design system 300, the circuit design database 350 may be part of the circuit design system 300. For example, the circuit design database 350 may be a module in memory 206. In one embodiment, the circuit design database 340 groups schematic data into three containers: (i) views which are implementations of circuits where each view holds one design database, (ii) cells which a group of views for the same circuit, and (iii) libraries which are groups of associated cells.

The overlay schematic database 360 stores overlay schematic data 362 and provides it to the circuit design system 300. The base overlay schematic data 362 may be generated at the circuit design system 300 and sent to the overlay schematic database 360 for storing. The overlay schematic data 362 also receives the modified overlay schematic data 354, as modified by the circuit design system 300, and stores it for later use. In one embodiment, the overlay schematic data 362 and the modified overlay schematic data 364 include synchronization information indicating the base schematic data 352 or the modified base schematic data associated with the overlay schematic data 362 and the modified overlay schematic data 364. Such synchronization information may include version information or time stamp of the overlay schematic data 362 and the modified overlay schematic data 364. The version information or the time stamp may include a Cyclic Redundancy Check (CRC) of the base schematic data 352.

The circuit design system 300 may include, among other components, an I/O controller hub 222, a memory 206, and graphics adapter 212. The I/O controller hub 222 receives user input from the input devices 210 and 214 as well as layout data from the circuit design database 350 external to the circuit design system 300, processes the received user input the overlay schematic data 362 and the base schematic data 352, and provides the processed information to the memory 206.

The memory 206 may store, among other modules, a schematic design module 304 and an overlay design module 314. The memory 206 may store other modules such as a schematic design module, a circuit simulator, a physical realization module, a stencil generation module, a design rule checking (DRC) module, and a layout vs schematic module that are not illustrated in FIG. 3. The memory 206 may also include only a subset of these modules.

The schematic design module 304 is a software module for performing schematic capture or schematic entry of a circuit design. Such operations include creating the base schematic data 352 and modifying the base schematic data 352 to generate the modified base schematic data 354. The modification or creation of the schematic data 352, 354 may include, among others, adding circuit objects, hiding circuit objects, and changing parameters associated with the circuit objects. In one embodiment, the schematic design module 304 may also perform EDA operations such as simulation, Layout Versus Schematic (LVS), schematic driven layout and schematic verification.

The overlay design module 314 is a software module that manages the overlay schematic data 352. The overlay design module 314 creates the base/modified overlay schematic data 362, 364, and checks if the base schematic data 352 has changed to perform synchronization of the overlay base schematic data 362 and the base schematic data 352, if applicable. The overlay design module 314 receives user input via the input device 210, 214 to create or modify the overlay schematic data, and applies it to the current schematic data for performing EDA operations such as simulation, Layout Versus Schematic (LVS), schematic driven layout and schematic verification. In one embodiment, the overlay design module 314 tracks user input for generating or modifying the overlay schematic data 362 and generates the overlay schematic data.

Example Process of Creating and Editing Overlay Schematic Data

Figure 4:
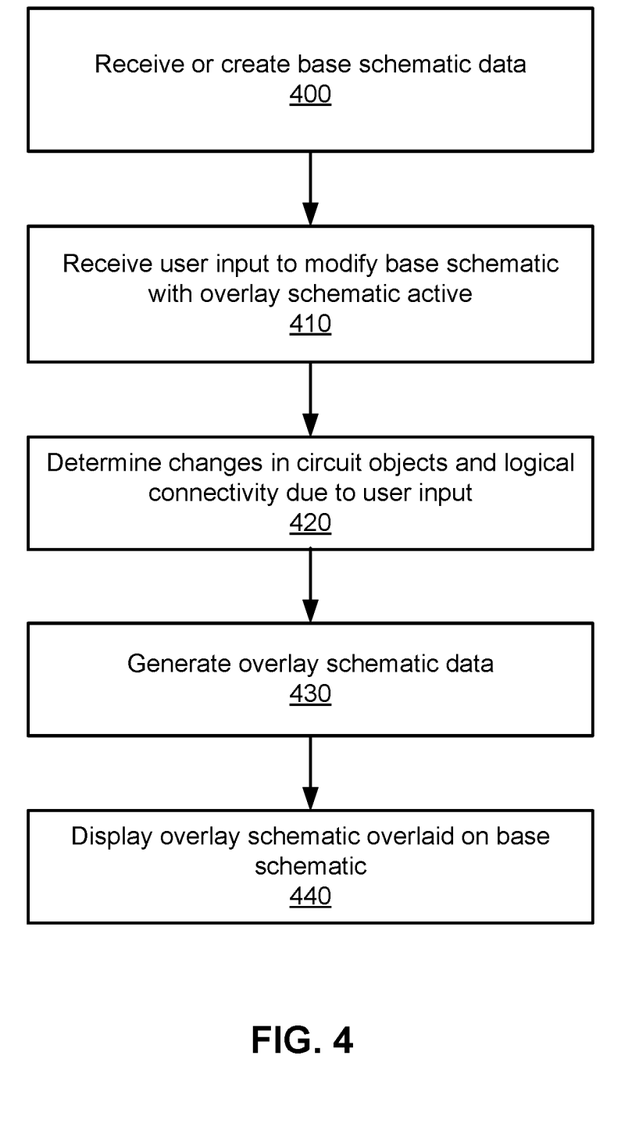
FIG. 4 is a flowchart illustrating using of overlay schematic data, according to an embodiment.

FIG. 4 is a flowchart illustrating using of overlay schematic data, according to an embodiment. The overlay schematic data represents an overlay schematic that is laid over the base schematic as represented by the overlay schematic data 362. The base schematic data 352 is received 400 or created in the circuit design system 300.

Then, the overlay schematic is activated on the base schematic data 362. When the overlay schematic is active, users can query, inspect and copy circuit objects and their connectivity in the base schematic data 352 but are not allowed to delete, move or stretch the circuit objects in the base schematic data 352. As user inputs to modify the base schematic data 352 are received 410, the overlay schematic is overlaid on the base schematic data 352 to give the appearance that the base schematic data 352 is modified for the purpose of performing certain EDA operations meanwhile maintaining the base schematic data 352 intact. For this purpose, the circuit objects in the base schematic data 364 are treated as read only data when the overlay schematic is active. When the overlay schematic is active, new instances and wires can also be added to the circuit design.

The overlay design module 314 determines 420 changes made to circuit objects and logical connectivity due to the user inputs while the overlay schematic is active. As part of this process, the overlay design module 314 differentiates between circuit objects that exist in the base schematic data 352 and circuit objects created for inclusion in the overlay schematic data 352.

The overlay design module 314 tracks the user input while in the overlay schematic is active, and generates 430 the overlay schematic data.

The circuit objects added or modified while the overlay schematic is active are displayed 440 on the base schematic (as indicated by the base schematic data). In one embodiment, circuit objects changed or added while the overlay schematic is active are graphically differentiated from the circuit objects in the base schematic data 352. For example, by showing the circuit objects and connections in different colors or shown in different types of lines. Other visual methods may be used to differentiate overlay circuit objects.

The steps and sequence of steps as illustrated in FIG. 4 are merely illustrative. For example, the process of generating 430 the overlay schematic data can occur after displaying 440 the overlay schematic. Further, receiving 410 of user input can be performed in parallel with determining 420 changes in the circuit objects and logical connectivity.

Example Uses of Overlay Schematic

It is often useful to remove parts of a circuit for testing purposes. As previously explained, an overlay schematic does not actually delete circuit objects in the base circuit 500 but may effectively remove the circuit objects base schematic for the purpose of certain EDA operations in a non-destructive manner. The non-destructive manner refers to the changes being reversible and accessible even after the overlay schematic data has been saved and the circuit design system 300 has been restarted.

In one embodiment, removing instances and wiring involves creating one or more opaque overlay masks over the circuit objects to be logically removed. All circuit objects under the overlay masks are effectively removed from the schematic for the purpose of certain EDA operations. This includes removing occluded circuit objects from the logical design and disconnecting wires at the boundary of the mask. The overlay mask can be a simple rectangle or any convex hull (contiguous region).

Figure 5A:
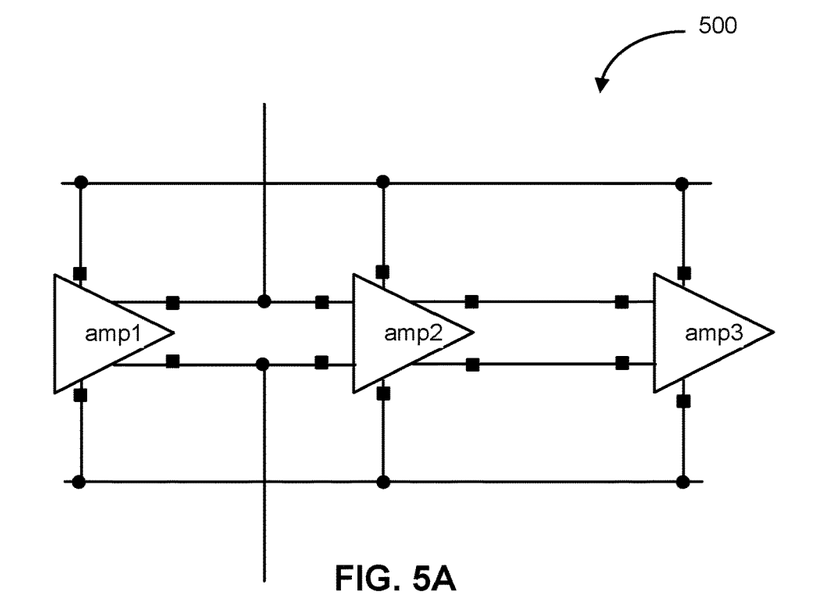
FIG. 5A is a schematic diagram of a base circuit, according to an embodiment.
Figure 5B:
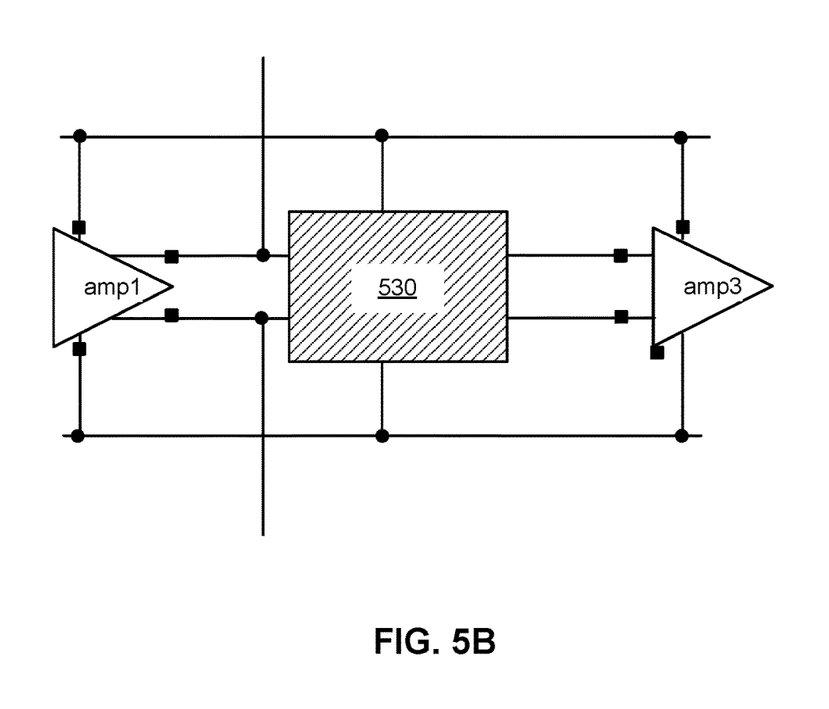
FIG. 5B is a schematic diagram illustrating placing of a schematic overlay mask over the schematic of the base circuit of FIG. 5A, according to an embodiment.

FIGS. 5A and 5B illustrate an example of using the overlay mask to remove a circuit object from the circuit design. FIG. 5A is a schematic diagram of a base circuit 500, according to an embodiment. The base circuit 500 may be represented by the base schematic data 352 received from the base schematic database 350 or may be newly created by the circuit design system 300. The base circuit 500 includes three amplifiers amp1, amp2, amp3 having wires between them.

FIG. 5B is a schematic diagram illustrating placing of a schematic overlay mask 530 to remove a circuit object amp2 from the base circuit 500 of FIG. 5, according to an embodiment. After placing the schematic overlay mask 530, the base schematic data 352 still includes the circuit object amp2, but EDA operations can now be performed on a modified circuit that no longer includes the circuit object amp 2.

Removing the circuit object or its wires from the circuit without changing the base schematic data 352 may involve the following. First, a property of the circuit object to be removed is changed to indicate a value of "ignore." Second, a wire being occluded by the schematic overlay mask can be moved to a different layer that is not used for wiring. If the schematic overlay mask only covers a portion of the wire, the wire is split at the mask boundary and only the portion of the wire occluded by the schematic overlay mask is moved to a different layer. Third, the wire label (i.e., text) associated with the removed wire is also moved to a different layer that is not used for wiring. These schemes of excluding the circuit objects from the circuit design are industry standard compliant, and all EDA tools compatible with Open Access schematics support these conventions.

In one embodiment, when removing the circuit objects by placing the schematic overlay mask, the overlay design module 314 also disconnects the wires at the mask boundary. When creating wires in the overlay schematic, new wires may be automatically added above the schematic overlay mask. For example, wires may be added over the overlay schematic mask 530 of FIG. 5B to connect the output terminals of amp 1 and the input terminals of amp 3. Such a scheme is convenient and avoids having to route around the overlay schematic mask to create new connectivity. In dense schematics, it is advantageous to route over the overlay schematic mask to avoid congestion and create easy to understand schematics.

As mentioned, the process is non-destructive. Objects hidden by the overlay schematic mask remain in the base schematic data 352. If the overlay schematic mask is deleted or moved, the base circuit objects remain in the schematic in an unmodified form. Whenever an overlay schematic mask is moved, resized or deleted, the overlay design module 314 determines the hidden or exposed circuit objects.

In some cases, a small portion of a base schematic may be the subject of testing. In this case, it would be cumbersome to create multiple overlay schematic masks to hide the majority of a schematic. To solve this problem, the overlay design module 314 enables the creation of inverse masks. All objects under the inverse mask are included in the circuit design for EDA operations as opposed to being removed. If an overlay schematic contains one or more inverse masks, all circuit objects not contained in an inverse mask are filtered out of the design. Note that this does not apply to circuit objects created in the overlay schematic. In other words, an inverse mask is equivalent to creating masks over all objects not under the inverse mask.

Figure 5C:
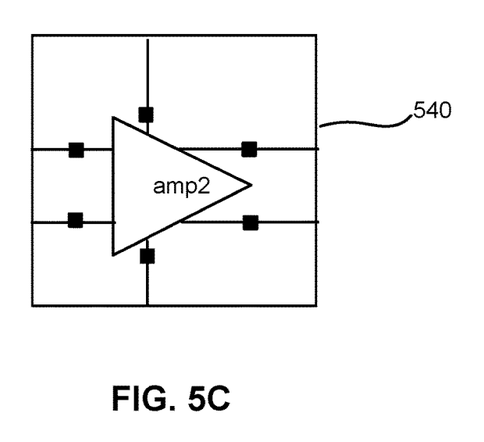
FIG. 5C is a schematic diagram illustrating placing of an inverse mask on the schematic of the base circuit, according to an embodiment.

FIG. 5C is a schematic diagram illustrating placing of an inverse mask 540 on the base circuit 500 of FIG. 5A, according to an embodiment. As illustrated in FIG. 5C, all circuit objects (e.g., amp1 and amp3) other than amp2 within the inverse mask 540 is removed from the schematic for the purposed of EDA operations.

Inverse masks can be graphically represented either as a transparent region indicated by rendering the area outside as an opaque region as shown in FIG. 5C or by a border showing other circuit objects.

Figure 6A:
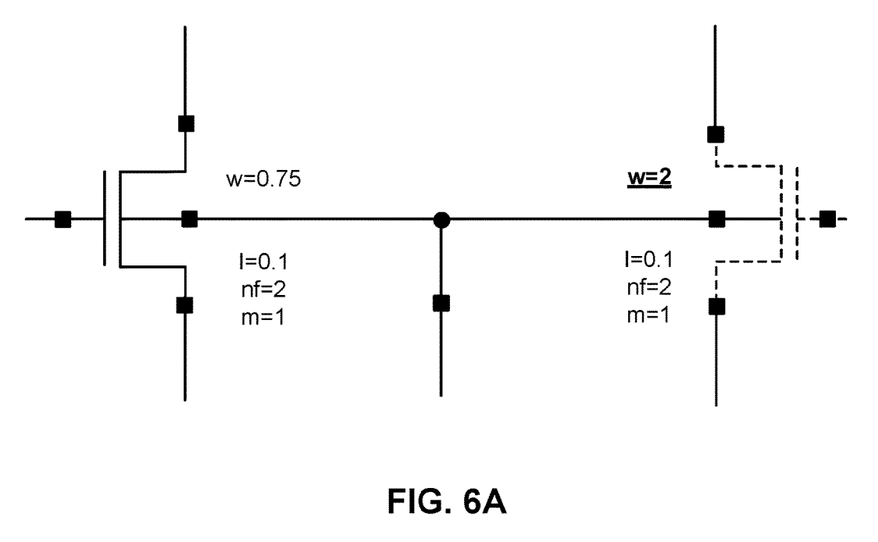
FIG. 6A is a schematic diagram illustrating change of a parameter of a circuit object, according to an embodiment.

FIG. 6A is a schematic diagram illustrating change of a parameter of a circuit object, according to an embodiment. The MOSFET on the right is a base circuit object (i.e., an object existing in the base schematic data 352), which has been modified by changing its width. The MOSFET on the right is visually differentiated from the MOSFET on the left that remain unchanged relative to the base schematic data 352. The differentiation can be different color, line type, highlighting or any other visually distinctive feature. Also, the parameter "w" is also differentiated visually to indicate what has been modified (e.g., displayed in a different color or with different font type). Other visual methods could be employed such as shadows, colored bounding boxes, font, line style etc.

When a user modifies a single parameter many other parameters can be impacted. In the example of FIG. 6A, when the width of the MOSFET is changed, the area of the source, drain and bulk are often automatically recomputed by the circuit design system 300. In such case the overlay design module 314 differentiates between the parameters directly modified by the user and those parameters recomputed by the circuit design system 300 by visual characteristics (e.g., color).

Figure 6B:
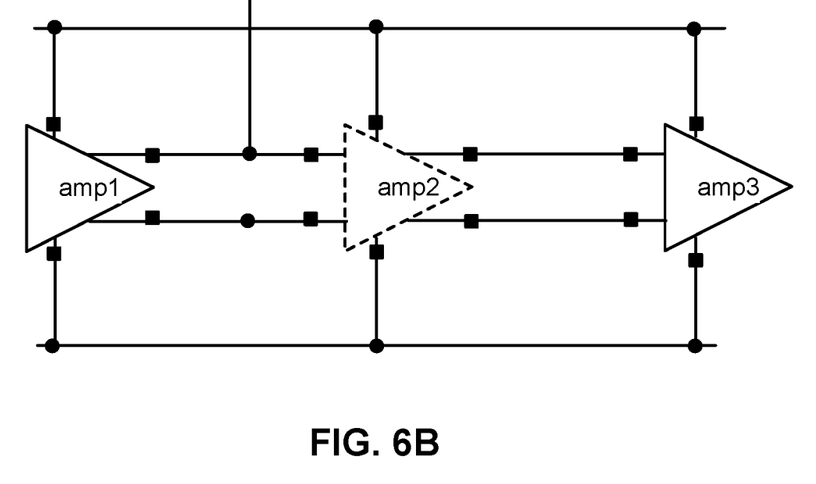
FIG. 6B is a schematic diagram displaying an amplifier with the changed circuit object in a visually distinguishable manner, according to an embodiment.

When a change is made to a circuit object in a lower hierarchical view, the overlay design module 314 may make the change visually distinguishable at a higher hierarchical view. Assume that the MOSFETs of FIG. 6A are part of an amplifier amp2 of FIG. 5A. When the parameter of the right MOSFET is modified, as described above with reference to FIG. 6A, the change is also visually differentiated in a schematic view of a higher hierarchy as illustrated in FIG. 6B. Amp1 and amp 3 does not have any changes relative to the base schematic data 352 whereas a parameter of the MOSFET in amp 2 has been changed. Hence, as shown in FIG. 6B, amp 2 is displayed visually distinguishable from amp 1 and amp 3. The visually distinction could be highlighting, different color or line thickness, etc.

If the amp 1 through amp 3 is part of a block that is higher in the hierarchy, that block would also be displayed in a manner visually distinguishable from other blocks having none of their sub-components modified.

Figure 7A:
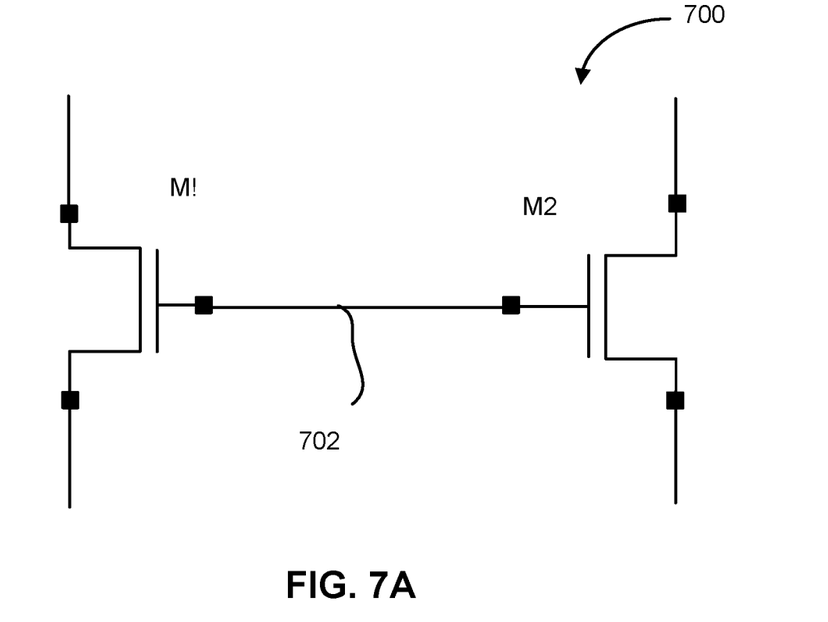
FIG. 7A is a schematic diagram illustrating a circuit design including two circuit objects, according to an embodiment.
Figure 7B:
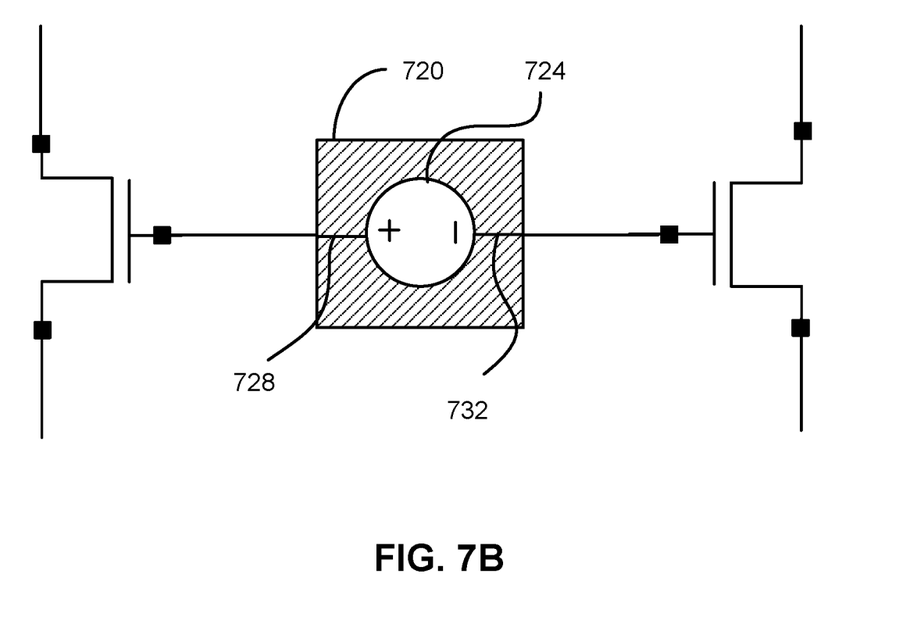
FIG. 7B is a schematic diagram illustrating the schematic of the circuit design of FIG. 7A overlaid with an added circuit object, according to an embodiment.

FIGS. 7A and 7B illustrate an example of adding a circuit element using overlay schematic, according to one embodiment. A circuit design 700 of FIG. 7A includes two circuit objects (a left MOSFET M1 and a right MOSFET M2). The gate terminals of both MOSFETs M1 and M2 are connected by wire 702. A user wants to make a design change adding a voltage source 724 between gate terminals of the two MOSFETs using the overlay schematic. Such design change can be made in the following order.

First, an overlay schematic mask 720 is placed over wire 702 to cut the wire at the border of the overlay schematic mask 720. Then, the voltage source 724 is placed on top of the overlay schematic mask 720, and additional wires 728 and 732 are placed on top of the overlay schematic mask 720 to connect the voltage source 724 to segmented portions of wire 702, obtaining the modified circuit design as illustrated in FIG. 7B.

Comparing Overlay Schematic

Overlay schematics represent incremental changes on top of a base circuit design. Such differences can be shown graphically or in a textual description. One embodiment of displaying textual differences is using a tree to display the logical differences including but not limited to the instances, parameters, and connectivity.

In one embodiment, a graphical user interface (GUI) may be used to display differences between a base schematic and an associated overlay schematic. A single button click/keybinding can be used to bring up the difference GUI. One way of showing graphical differences is to display the base reference design and the overlay design side by side. Clicking on the difference in the textual description can be used to browse to and highlight the difference in the displayed schematic. Viewport operations like pan and zoom are linked between the canvases. This allows quick inspection of the same region of the reference and overlay schematics.

In one embodiment, the selection of objects in the circuit designs links with the textual difference. By doing so, users quickly perceive the logical differences when viewing the schematic (graphical) differences. Selection can also be linked to GUI showing the properties and attributes of the selected circuit object(s). This provides access to both the difference between the selected circuit object(s) and the similarities.

Synchronization of Overlay Schematic

Synchronization described herein refers to maintaining versions of the base schematic data associated with its counterpart overlay schematic data. Overlay schematic data stores timestamps and version information about the base schematic data. If the base schematic data in memory or on a disk does not match the version information stored in the overlay schematic data, the overlay schematic data is referred to as being out of date.

Schematic overlay scheme may support two modes of synchronization: implicit synchronization and explicit synchronization. In Implicit synchronization, the overlay schematic data is kept in sync with the base schematic data without prompting the user. In contrast, explicit synchronization allows the users to choose when to merge changes from the base schematic data into the overlay schematic data.

In implicit synchronization, when an out of date overlay schematic data is detected, the circuit objects stored in the overlay schematic data are immediately updated to match the base schematic data. In explicit synchronization the user is prompted to accept or reject changed objects. In one embodiment, a summary of change information is provided to help the user understand the changes and decide if the change should also be made to the schematic overlay. The summary can indicate, among others, who made the change, user comment associated with the change, and textual and graphical report of the changes. In both modes, an informational log is kept in the overlay schematic data to track when changes were made and by whom.

The foregoing description of the embodiments has been presented for the purpose of illustration; it is not intended to be exhaustive or to limit the invention to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A computer-implemented method for modifying an integrated circuit (IC) design, comprising:
displaying at least a part of a base schematic data including a plurality of base objects;
receiving modification information indicating a change in the base schematic data;
responsive to receiving the modification information, producing schematic overlay data representing modification to at least one of the base objects or connectivity between the base objects in the base schematic data;
generating a modified schematic data representing the base schematic data as modified by the schematic overlay data, the base schematic data representing a circuit different from a modified circuit corresponding to the modified schematic data, the modified circuit being modified with respect to at least one of: (i) omission of an object and removal of one or more connections associated with the omitted object, or (ii) inclusion of an object and addition of at least one connection associated with the included object;

performing an electronic design automation (EDA) operation based on the modified schematic data; and
retaining the base schematic data unchanged during or after performing of the EDA operation.

2. The method of claim 1, wherein the modification includes a change of properties of one or more of the base objects, a removal of at least a subset of the one or more base objects, or an addition of at least one new object relative to the base schematic data including a plurality of base objects.

3. The method of claim 2, wherein:
displaying of the modified schematic data comprises displaying one or more of the base objects or the at least one added new object to have a different display feature compared to base objects that remain unchanged.

4. The method of claim 3, wherein the different display feature includes a color in which objects are displayed.

5. The method of claim 1, further comprising generating timestamp information of the schematic overlay data, the timestamp information indicating at least one of (i) a reference to the base schematic data, (ii) information indicating time at which the schematic overlay data was stored in a database, (iii) a number of changes made to the schematic overlay data, and (iv) a cyclic redundancy check of the schematic overlay data.

6. The method of claim 1, wherein displaying of the modified schematic comprises placing an opaque schematic overlay mask on a subset of base objects in the base schematic data to be removed in the modified schematic data.

7. The method of claim 1, further comprising displaying a user interface element representing difference between the modified schematic data and the base schematic data.

8. The method of claim 7, further comprising:
receiving a user input to select a changed base object or base logical connectivity displayed in the user interface element; and
displaying the selected base object or the base logical connectivity in a highlighted appearance.

9. The method of claim 1, further comprising:
updating the schematic overlay data responsive to detecting change in the base schematic data.

10. The method of claim 9, wherein updating of the schematic overlay data is performed responsive to receiving a user command to accept or reject change in the base schematic data.

11. The method of claim 1, wherein displaying the modified schematic data comprises displaying the modified schematic data in a first circuit view or a second circuit view lower in hierarchy than the first circuit view, wherein a first object in the first circuit view having a highlighted appearance responsive to making change in a second object or logical connectivity relative to the base schematic data, the second object or the logical connectivity displayed in the first circuit view and included in the first object.

12. The method of claim 1, wherein the EDA operation comprise at least one of simulation, Layout Versus Schematic (LVS), schematic driven layout and schematic verification performed on the modified schematic data.

13. The method of claim 1, further comprising displaying the modified schematic data.

14. A non-transitory computer-readable storage medium storing instructions thereon, the instructions when executed by a processor cause the processor to:
display at least a part of a base schematic data including a plurality of base objects;
receive modification information indicating a change in objects or logical connectivity in the base schematic data relative to the base schematic data;
responsive to receiving the modification information, producing schematic overlay data representing modification to at least one of the base objects or connectivity between the base objects in the base schematic data;
generate a modified schematic data representing the base schematic data as modified by the schematic overlay data, the base schematic data representing a circuit different from a modified circuit corresponding to the modified schematic data, the modified circuit being modified with respect to at least one of: (i) omission of an object and removal of one or more connections associated with the omitted object, or (ii) inclusion of an object and addition of at least one connection associated with the included object;
perform an electronic design automation (EDA) operation based on the modified schematic data; and
retain the base schematic data unchanged during or after performing of the EDA operation.

15. The non-transitory computer-readable storage medium of claim 14, wherein the modification includes a change of properties of one or more of the base objects, a removal of at least a subset of the one or more base objects, or an addition of at least one new object relative to the base schematic data.

16. The non-transitory computer-readable storage medium of claim 15, further storing instructions causing the processor to:
displaying of the modified schematic data comprises displaying one or more of the base objects or the at least one added new object to have a different display feature compared to base objects that remain unchanged.

17. The non-transitory computer-readable storage medium of claim 14, further comprising instructions causing the processor to generate a timestamp information of the schematic overlay data, the timestamp information indicating at least one of (i) a reference to the base schematic data, (ii) information indicating time at which the schematic overlay data was stored in a database, (iii) a number of changes made to the schematic overlay data, and (iv) a cyclic redundancy check of the schematic overlay data.

18. The non-transitory computer-readable storage medium of claim 14, wherein:
instructions causing the processor to display the modified schematic comprise instructions to place an opaque schematic overlay mask on a subset of base objects in the base schematic data to be removed in the modified schematic data.

* * * * *